(12) United States Patent
Mitra et al.

(10) Patent No.: US 9,656,913 B2
(45) Date of Patent: May 23, 2017

(54) TRANSPARENT LAMINATE WHICH INHIBITS PUNCTURE BY PROJECTILES

(71) Applicant: Schott AG, Mainz (DE)

(72) Inventors: Ina Mitra, Stadecken-Elsheim (DE); Andreas Langsdorf, Ingelheim (DE); Christoph Gross, Frankfurt a. M. (DE); Ulrike Stoehr, Mainz (DE); Kurt Schaupert, Hofheim (DE)

(73) Assignee: SCHOTT AG, Mainz (DE)

( * ) Notice: Subject to any disclaimer, the term of this patent is extended or adjusted under 35 U.S.C. 154(b) by 353 days.

(21) Appl. No.: 14/020,088

(22) Filed: Sep. 6, 2013

(65) Prior Publication Data

US 2014/0072754 A1    Mar. 13, 2014

(30) Foreign Application Priority Data

Sep. 7, 2012  (DE) .................. 10 2012 215 864

(51) Int. Cl.
| | | |
|---|---|---|
| *B32B 7/02* | (2006.01) | |
| *C03C 21/00* | (2006.01) | |
| *B32B 17/10* | (2006.01) | |
| *F41H 5/04* | (2006.01) | |

(52) U.S. Cl.
CPC ........ *C03C 21/00* (2013.01); *B32B 17/10045* (2013.01); *B32B 17/10119* (2013.01); *B32B 17/10137* (2013.01); *C03C 21/001* (2013.01); *F41H 5/0407* (2013.01); *B32B 2307/536* (2013.01); *Y10T 428/239* (2015.01); *Y10T 428/24992* (2015.01); *Y10T 428/269* (2015.01); *Y10T 428/315* (2015.01)

(58) Field of Classification Search
CPC ............... B32B 17/10; B32B 2369/00; B32B 17/10045; B32B 17/10119; B32B 17/10137; B32B 2307/536; Y10T 428/239; Y10T 428/24992; Y10T 428/269; Y10T 428/315
USPC ........................................................ 428/220
See application file for complete search history.

(56) References Cited

U.S. PATENT DOCUMENTS

| | | | | |
|---|---|---|---|---|
| 4,144,684 A | * | 3/1979 | Kirkbride | ............... C03C 17/00 428/34 |
| 5,380,575 A | * | 1/1995 | Kuster | .............. B32B 17/10036 296/84.1 |
| 5,773,148 A | * | 6/1998 | Charrue | ................... C03C 3/085 428/410 |
| 5,846,280 A | * | 12/1998 | Speit | ...................... C03C 3/095 501/54 |
| 2005/0003136 A1 | * | 1/2005 | Kurachi | .................. C03C 3/085 428/846.9 |
| 2007/0060465 A1 | | 3/2007 | Varshneya et al. | |
| 2010/0221461 A1 | * | 9/2010 | Torr | ....................... B32B 17/10 428/34 |
| 2011/0281093 A1 | * | 11/2011 | Gulati | ................... B32B 37/144 428/213 |

FOREIGN PATENT DOCUMENTS

| | | |
|---|---|---|
| DE | 69227344 | 6/1999 |
| DE | 102008043718 | 5/2010 |
| WO | 2011/120680 | 10/2011 |

OTHER PUBLICATIONS

NATO/PfP Unclassified, "Procedures for Evaluating the Protection Level of Logistic and Light Armoured Vehicles:" AEP-55, vol. 1, Ed. 1, Feb. 2005, 57 pp.
VPAM Apr. 2006, "General basis for ballistic material, construction and product testing," Edition: May 14, 2009, pp. 1-29.

* cited by examiner

*Primary Examiner* — Aaron Austin
*Assistant Examiner* — Lawrence Ferguson
(74) *Attorney, Agent, or Firm* — Ohlandt, Greeley, Ruggiero & Perle, L.L.P.

(57) ABSTRACT

A transparent laminate is provided that includes at least one chemically prestressed pane having a thickness, a compressive stress (CS) of a surface layer, a thickness of the prestressed surface layer and a tensile stress (CT) of an interior portion. The tensile stress (CT) is greater than 0 and is less than the compressive stress divided by 50.

25 Claims, 1 Drawing Sheet

TRANSPARENT LAMINATE WHICH INHIBITS PUNCTURE BY PROJECTILES

CROSS REFERENCE TO RELATED APPLICATIONS

This application claims benefit under 35 U.S.C. §119(a) of German Patent Application No. 10 2012 215 864.2, filed Sep. 7, 2012, the entire contents of which are incorporated herein by reference.

BACKGROUND OF THE INVENTION

1. Field of the Invention

The invention relates to a transparent laminate, in particular a laminate which inhibits puncture by projectiles, which has a chemically prestressed pane having a thickness d, a compressive stress of the surface CS, a penetration depth of the prestressed layer DOL and a tensile stress in the interior CT.

2. Description of Related Art

Transparent protection against the effect of ballistic projectiles, for example against gun ammunition and shrapnel, is produced from glass plates or panes which are laminated together by means of polymer films or pourable resin layers. As glass material, use is generally made of soda-lime glass and in the case of relatively thick composites low-iron soda-lime glass because of the required transmission. The protection action of the composites is determined and classified by standardized methods, as are presented by way of example in the specifications STANAG 4569 and DIN 1063 or VPAM APR 2006. STANAG 4569 provides, for example for protection class 3, a test using hard-core ammunition of the calibre 7.62×51 having a tungsten carbide core and of the calibre 7.62×54R having a steel core. Furthermore, the effect of grenade shrapnel is tested by means of a test using 20 mm "fragment-simulating projectiles" (FSP). This impact has to be withstood by the composite so that the projectiles neither pass through nor are particles which could cause injury or significant damage to persons or objects to be protected behind the protective facility released by the protective facility.

A reduction in the weight per unit area of the transparent protection can be achieved by, for example, partial or complete replacement of the glass plates composed of soda-lime glass by at least partially crystalline materials such as glass-ceramic, transparent ceramics or crystalline materials such as sapphire.

However, for cost reasons, the high-priced transparent ceramics which are highly effective in providing protection and other crystalline materials are barely used.

A critical factor for use in vehicles is, apart from sufficient protective effect, a very low weight per unit area of the composites since this represents part of the total weight of the vehicle and any weight improvement thus makes it possible to increase the useful load of the vehicle. In general, transparent protective facilities are arranged in the upper region of the vehicle, i.e. above its centre of gravity. This leads to a low weight of the transparent protection also being able to improve the travelling stability on poor roads and when travelling around curves.

Further critical factors for use in vehicles are good emergency vision properties which make it possible to see through the pane to a restricted extent even after breakage of one or more panes.

DE 10 2008 043 718 A1 describes tank glazing comprising at least one outward-facing transparent glass-ceramic pane (a) which has a thickness in the range 3-20 mm, optionally at least one pane (b) selected from the group consisting of borosilicate glass, soda-lime glass and aluminosilicate glass and having a thickness in the range 3-20 mm, which can be chemically prestressed, and at least one transparent polymer pane (c), in particular polycarbonate pane, facing the object to be protected, where the thickness of the pane (c) is in the range from 3 to 15 mm; the individual panes are joined by transparent intermediate layers composed of pourable resin or polymer films. This tank glazing has, inter alia, the disadvantage of high costs caused by the glass-ceramic pane used.

DE 692 27 344 T2 discloses transparent safety glazing for aircraft, which comprises a chemically prestressed glass pane which faces the interior and is provided with a splinter protective layer composed of PU on its side facing the cabin, a 4 mm thick, outer glass pane and a PVB intermediate layer which consists of 7 layers and has a total thickness of about 4 mm and is arranged between outer and inner glass pane.

US 2007/0060465 A1 discloses a chemically prestressed lithium aluminosilicate glass which has a high resistance to breakage in the event of impact of high-velocity projectiles, where the glass is characterized by a compressive stress in the surface of at least 100 000 psi and a depth of the compressively stressed region of at least 600 microns. In the document, it is stated that the glass offers a very high resistance to breakage. Arrangement of the glass pane in a laminate is not discussed.

Finally, WO 2011/120680 discloses a transparent facility for protection against impact, projectiles, shrapnel or pressure waves, which comprises at least four brittle panes, with a chemically prestressed, brittle pane being arranged at a distance of from 6 mm to 20 mm from the exposed side.

BRIEF SUMMARY OF THE INVENTION

It is an object of the present invention to provide a transparent laminate which has a high protective effect, in particular in respect of projectiles, combined with a low weight per unit area and advantageous production costs but preferably does not comprise any ceramic or glass-ceramic panes. The laminate provided should also have good emergency vision properties which allow a view through the laminate to a restricted extent even after breakage of one or more panes of the laminate.

The transparent laminate of the invention comprises at least one chemically prestressed pane which has a thickness d and a compressive stress of the surface CS, a thickness of the prestressed layer DOL and a tensile stress in the interior CT and is characterized in that the tensile stress in the interior CT satisfies the following condition: $0<CT<CS/50$.

The relationship indicated in the formula relates in each case to the absolute value of the stress CT and the absolute value of the stress CS, which will be clear to a person skilled in the art by reporting of the CT value as tensile stress and reporting of the CS value as compressive stress. Both the value CT reported as tensile stress and the value CS reported as compressive stress thus have positive values.

The inventors have recognized that the tensile stresses in the interior have a strong influence on the resistance of a laminate to puncture by projectiles. The chemically prestressed pane therefore generally has low tensile stresses in the interior. If the tensile stresses in the interior CT become too great, an unsatisfactory fracture picture with strong splintering results. The strong splintering leads to a reduction in the resistance to puncture by projectiles for further projectiles and also to poor emergency vision properties.

The use of chemically prestressed panes having excessively high tensile stress values in the interior CT in the bulletproof laminates thus does not lead to an improvement in the properties and can even lead to a deterioration. It is therefore important to balance the positive effect of a high tensile stress on the surface CS and the potential adverse effect of an excessively high CT.

A laminate according to the invention is generally a multilayer composite material made up of panes and optionally layers of adhesive which are firmly joined to one another. The laminate is preferably flat, but can also be curved, in which case the individual panes of the laminate likewise have a curvature. Transparent means that the laminate has sufficient transmission in the visible wavelength range to allow use as vehicle glazing, at least a transmission of more than 30% but typically more than 75% at 550 nm.

The chemically prestressed pane is generally a glass pane having a uniform thickness d. Such panes can in general be produced by processes known to those skilled in the art, e.g. the float process, up- or down-draw processes or an overflow fusion process. Costlier production from block glass is likewise conceivable. The substrate can likewise have been subjected to a subsequent surface treatment by polishing and optionally grinding. The chemical hardening is carried out in a subsequent process step in which the pane is exposed at elevated temperatures to a salt bath, or various salt baths in succession, in which relatively small ions in the surface layer of the glass are replaced by larger ions in the salt bath. This results in a compressive stress in the surface CS in the form of a compressive stress which leads to an increase in the flexural strength of the pane. A tensile stress CT which acts in the opposite direction to the compressive stress and is relatively constant over the unprestressed volume is built up in the interior of the glass. The stress conditions in a chemically prestressed pane are shown by way of example in FIG. 1.

The thickness of the prestressed layer DOL within the meaning of the invention can be determined by means of a stress-optical zero-transmission measurement method, for example by means of a measuring instrument having the commercial designation FSM-6000. The compressive stress of the surface CS of the pane can likewise be determined by means of this measuring instrument.

The thickness of the prestressed layer DOL generally corresponds approximately to the penetration depth of the relatively large ions from the salt bath into the glass surface.

The tensile stress in the interior CT of a pane which has been chemically prestressed on both sides is given approximately by the following formula:

$$CT = (CS \cdot DOL)/(d - 2 \cdot DOL)$$

where it is assumed that the stress determined over the layer thickness in the prestressed layer corresponds to approximately half of the compressive stress value at the surface CS and the stress in the interior is constant and has the value CT. This approximation formula is well-known to those skilled in the art and is also used for determining the CT value in this description.

It has been found to be particularly advantageous for the absolute value of the tensile stress in the interior CT to be less than one hundredth and preferably less than a 150th of the compressive stress of the surface CS. This further improves the breakage behaviour of the pane and thus improves the emergency vision properties.

In an embodiment, the tensile stress in the interior CT is preferably more than 1 MPa and can also be more than 2 MPa.

The chemically prestressed pane preferably has a compressive stress of the surface CS of 300 MPa or more, better 400 MPa or more and even better 500 MPa or more. The chemically prestressed pane particularly preferably even has a compressive stress of the surface CS of 700 MPa and even better 900 MPa or more. The flexural strength of the pane is steadily increased with increasing compressive stress and the laminate can elastically absorb a correspondingly high proportion of the projectile energy when struck by a projectile.

In an embodiment, the chemically prestressed pane has a thickness of 3 mm or more, preferably 6 mm or more and particularly preferably 9 mm or more.

The chemically prestressed pane is preferably chemically prestressed over its entire surface including the circumferential side face. The inventors have discovered that the hardening of the circumferential edge surprisingly has an important influence on the puncture resistance of the laminate. Since the velocity of sound in the glass of from 2000 to 7000 m/s is a multiple of the projectile velocity of about 1000 m/s, the sound or shockwave can in the case of relatively small laminates or projectile impact near the edge reach and damage the outer edge of the laminate before the projectile has completely punctured the laminate. The influence of the edge hardening on the puncture resistance is nevertheless surprising since the edge does not, on the basis of high-speed photographs, represent the initiation of fracture but rather the place where the projectile penetrates into the pane. A higher ballistic quality due to edge hardening therefore was not to be expected.

In comparative experiments on laminates having the dimensions 500×500 mm² with four-fold projectile impact and 100×100 mm² with single projectile impact with an otherwise identical laminate structure according to the invention, the inventors have found that the laminates having a smaller area surprisingly have a limit velocity $v_L$ in accordance with STANAG 4569 which is usually attained only by large laminates. The experimental laminates comprised chemically prestressed glass panes, with the circumferential edge also having been chemically prestressed. Such an increased limit velocity $v_L$ was expected only in the case of large laminates since in the case of relatively large laminates held in a frame, a longer elastic deformation part of the laminate is available, so that the laminate having the larger area should be able to absorb more projectile energy. It is presumed that the high limit velocity $v_L$ in the case of small laminates is attributable, inter alia, to the chemical prestressing of the nearby edge. The laminate according to the invention therefore preferably has a geometry in which every point on the area of the laminate has a distance from the closest laminate edge of less than or equal to 125 mm, preferably less than or equal to 80 mm and particularly preferably less than or equal to 40 mm. In addition, the invention has been found to be particularly advantageous in the case of laminates in which, due to their geometry, each point on the area of the laminate also has a distance from the farthest removed laminate edge of less than or equal to 150 mm and preferably less than or equal to 80 mm.

To ensure the full advantageous effect of the chemically prestressed circumferential edge of the chemically prestressed pane, especially in combination with a small-area laminate, even in the case of the second and subsequent shot, a large-area protective laminate can also be assembled from a plurality of small-area laminate sections in order to obtain a total laminate having a higher limit velocity $v_L$. In this way, for example, damage from the first shot can be prevented from spreading over the section boundaries of a small-area laminate into the region of the following shots, so that an offset second and third shot also hit largely undamaged laminate regions in which the effect of the prestressed surface and edge is fully effective. Thus, a large-area laminate which has at least two laminate sections according to the invention which adjoin one another is also provided by the present invention.

The laminate preferably has two, preferably three or more, chemically prestressed panes, which enables the resistance to puncture by a projectile to be increased further.

The laminate preferably has a total thickness of from 30 mm to 200 mm and preferably from 50 mm to 150 mm. These laminate thicknesses are also necessary in the case of the laminate according to the invention in order to achieve a sufficient resistance to puncture by hard-core projectiles. The laminate of the invention preferably satisfies protection class 3 according to STANAG 4569.

At least one of the chemically prestressed panes is preferably an aluminosilicate glass pane or a lithium aluminosilicate glass pane. The chemically prestressed pane preferably has, in a region which has not been ion-exchanged, the following components in percent by weight (% by weight):

| | |
|---|---|
| $SiO_2$ | 55 to 72 |
| $Na_2O$ | 8 to 16 |
| $Al_2O_3$ | 11 to 22 |
| $K_2O$ | 0.5 to 7 |
| MgO | 0 to 9 |
| $ZrO_2$ | 0 to 5 |
| ZnO | 0 to 4 |
| CaO | 0 to 4 |
| $TiO_2$ | 0 to 1 | and refining agents in customary amounts.

The lithium aluminosilicate glass pane can further comprise sulphates, fluorine and/or chlorine as refining agents. Glass panes having this composition can be produced by means of a float process and have excellent chemical hardenability in a salt bath comprising potassium ions.

The chemically prestressed pane particularly preferably consists, in a region which has not been ion-exchanged, of the following components in percent by weight (% by weight):

| | |
|---|---|
| $SiO_2$ | 57 to 63 |
| $Na_2O$ | 11 to 16 |
| $Al_2O_3$ | 15.1 to 18.5 |
| $K_2O$ | 2.8 to 5.0 |
| MgO | 3 to 9 |
| $ZrO_2$ | 0 to 5 |
| ZnO | 0 to 4 |
| CaO | 0 to 4 |
| $Na_2O + K_2O + MgO + ZnO + CaO$ | 15 to 28 |
| $TiO_2$ | 0 to 1 |
| $SnO_2 + Cl + F + SO_3 + CeO_2$ | 0 to 1.5 |

The pane is preferably produced in a float process and is installed in the laminate with the tin-bath side facing the exposed side. According to the invention, preference is given to using relatively thick panes which can be produced most efficiently by means of a float process. However, the inventors have recognized that surface defects can be generated on the tin bath side in the float process and these can represent mechanical weak points when the pane is subjected to flexural stress even after chemical hardening. However, if a float glass pane is installed in the laminate with its tin bath side facing the exposed side, the surface defects are merely subjected to noncritical compressive stresses when an object hits the exposed side while the opposite side of the pane is subjected to the critical tensile stress.

The laminate preferably has a transparent polymer layer on the side facing away from the exposed side. The polymer layer can be configured, for example, as a pane made of polycarbonate, polymethyl methacrylate or polyethylene-polyethylene terephthalate or a combination of individual layers of the materials. In contrast to the brittle glass layers, these materials have a fracture behaviour exhibiting fracture toughness, as a result of which the splinters formed in the laminate can be kept in the laminate.

A thin glass pane having a thickness of from 0.05 to 2 mm is preferably arranged on the surface of the polymer layer facing away from the exposed side, with the thin glass pane being able to be chemically prestressed. The thin glass pane represents a mechanically and chemically stable final layer of the laminate on the side of the laminate opposite the exposed side, i.e., for example, the side facing the vehicle interior. It prevents mechanical scratching of the pane or damage caused by aggressive cleaners or other chemicals since it has a significantly higher mechanical strength and chemical resistance than the transparent polymer layer. If splinters come out of the thin glass pane on impact of a projectile, these are not dangerous because of their low mass.

The individual panes of the laminate are joined to one another by means of transparent intermediate layers composed of pourable resin or polymer films.

The laminate according to the invention can be used as protective pane for protection against action of impact, projectiles, including FSP (fragment simulating projectile) and EFP (explosively formed projectiles), shrapnel/splinters or pressure waves, both in mobile applications such as armoured air, water and land vehicles including rail vehicles in the civilian and military sector and also fixed-position applications such as glazing of buildings.

DETAILED DESCRIPTION

Figure 1:
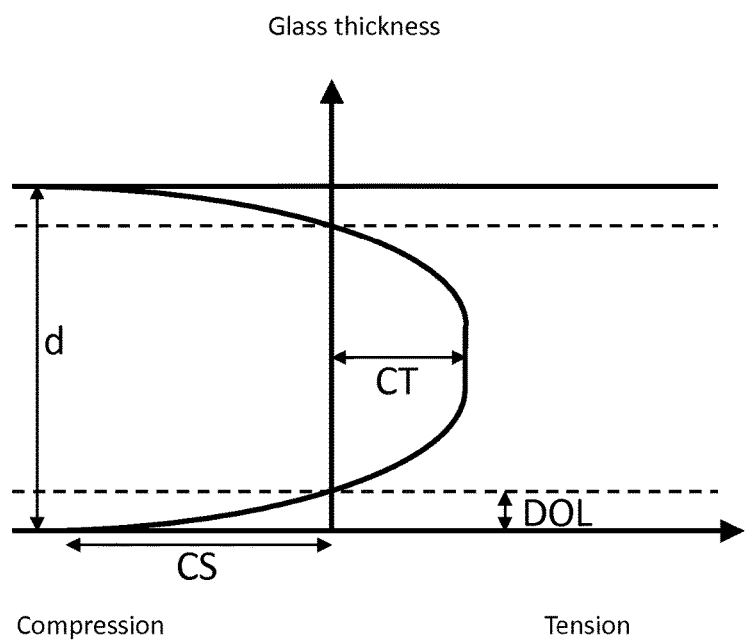
FIG. 1: Schematic depiction of the stress distribution in a chemically prestressed pane.
Figure 2:
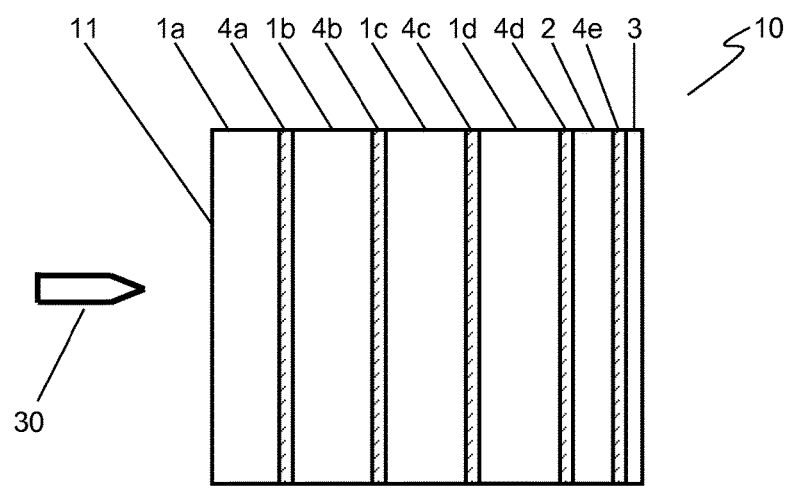
FIG. 2: Laminate according to the invention.

FIG. 1 shows, by way of example, the stress profile in a chemically prestressed pane in the direction of the pane thickness. While the pane is under compressive stress in the region of the surface and attains a value CS (Compressive Stress) on the two surfaces, the interior of the pane is under a tensile stress CT (Centre Tension). The depth at which the compressive stress changes into tensile stress is denoted as DOL (Depth of Layer) and can be determined stress-optimetrically. The DOL corresponds approximately to the thickness of the surface layer in which ion exchange has taken place, FIG. 2 shows the structure of a laminate (10) according to the invention, comprising four chemically prestressed panes (1a, 1b, 1c, 1d), a transparent polymer layer (2) and a thin glass pane (3), with the layers mentioned being joined to one another by means of transparent intermediate layers (4a, 4b, 4c, 4d, 4e) composed of pourable resin or polymer films. A projectile (30) is indicated on the exposed side (11) of the laminate.

Example

The invention is illustrated below with the aid of an example "laminate A". A "laminate C" which has a structure according to the prior art and has the same weight per unit area serves as comparative example.

Laminate A comprises eight panes of chemically prestressed aluminosilicate glass having a thickness of 8.1 mm each and a polycarbonate pane which has a thickness of 3 mm and finishes off the laminate. The aluminosilicate glass panes and the polycarbonate pane are joined to one another by means of a total of 8 organic intermediate layers composed of the commercial polymer "Krystalflex PE399" from the manufacturer Huntsman, which each have a thickness of 0.76 mm and only for joining to the polycarbonate pane have a thickness of 1.27 mm. The laminate thus has a total thickness of 74.4 mm. The composite is produced in a commercial autoclave. The laminate has a weight per unit area of 172 kg/m². The eight aluminosilicate glass panes are produced in a float process and have the following composition in % by weight:

| | |
|---|---|
| $SiO_2$ | 60.0 |
| $Na_2O$ | 12.5 |
| $Al_2O_3$ | 17 |
| $K_2O$ | 4 |
| MgO | 4 |
| $ZrO_2$ | 1.5 |
| $SnO_2$ | 0.3 |
| $CeO_2$ | 0.3 |

The chemical hardening of the aluminosilicate glass panes was carried out for a period of 6 hours in a $KNO_3$ salt solution at a temperature of 420° C., with the panes in each case being preheated and after-heated for about 0.5 hour at a temperature of about 200° C. before and after the salt bath. The thickness of the prestressed layer DOL was determined stress-optometrically and is 48 μm, while the compressive stress of the surface CS is about 950 MPa. The tensile stress in the interior of an aluminosilicate glass pane is thus about 5.7 MPa. The aluminosilicate glass panes have a tensile strength in bending of 1.1 GPa determined by a double-ring method based on DIN EN1288-5. The panes are floated and not additionally worked. In particular, no mechanical polishing of the surfaces was carried out.

A conventional laminate which instead of the chemically prestressed panes comprises unprestressed borosilicate glass panes of the type Borofloat 33 and whose further structure is the same as laminate A serves as comparative material "laminate C". The thickness of the borosilicate glass panes was modified from 8.1 mm to 9.1 mm so that the laminate C has the same number of panes and the same weight per unit area as laminate A. The total thickness of laminate C is thus 82.4 mm.

To determine the projectile impact resistance, at least 10 sections in each case of the above-described laminate A and the laminate C having dimensions of 100×100 mm² were produced, with one shot being fired at each section. The specimens were clamped in a circumferential frame.

Testing of the protective effect was carried out by a projectile of the type 7.62 mm×51 AP (tungsten carbide core) being fired at the specimen, with the speed of arrival of the projectile being altered and the limit velocity $v_L$ thus being determined. If the projectiles penetrate through the laminate, their exit velocity behind the laminate was determined. The limit velocity $v_L$ is the velocity at which the projectile remains embedded in the laminate with a probability of 50%, i.e. passage through the laminate is prevented to a probability of 50%.

The following values are obtained for the limit velocity $v_L$

| | |
|---|---|
| Laminate A | >1080 m/s +/− 30 m/s |
| Laminate C | 980 m/s +/− 30 m/s |

The laminate according to the invention thus has a significantly higher limit velocity $v_L$. In addition, the laminate has an 8 mm lower thickness than laminate C.

Due to the test apparatus available, a velocity of 1080 m/s could not be exceeded. All shots at this or lower projectile velocity remained embedded in the laminate A. $v_L$ is thus certainly above this maximum velocity of 1080 m/s, but could not be determined exactly.

What is claimed is:

1. A transparent laminate comprising:
    at least one chemically prestressed pane, where the at least one chemically prestressed pane has a thickness, a compressive stress (CS) of a prestressed surface layer, a thickness of the prestressed surface layer, and a tensile stress (CT) in an interior, wherein the tensile stress (CT) is greater than 0 and less than the compressive stress (CS) divided by 50, wherein the at least one chemically prestressed pane has a compressive stress (CS) of 400 MPa or more.

2. The transparent laminate according to claim 1, wherein the tensile stress (CT) is less than the compressive stress (CS) divided by 100.

3. The transparent laminate according to claim 1, wherein the tensile stress (CT) is less than the compressive stress (CS) divided by 150.

4. The transparent laminate according to claim 1, wherein the tensile stress (CT) is more than 1 MPa.

5. The transparent laminate according to claim 1, wherein the tensile stress (CT) is more than 2 MPa.

6. The transparent laminate according to claim 1, wherein the at least one chemically prestressed pane has a compressive stress (CS) of 700 MPa or more.

7. The transparent laminate according to claim 1, wherein the at least one chemically prestressed pane has a compressive stress (CS) of 900 MPa or more.

8. The transparent laminate according to claim 1, wherein the thickness of the at least one chemically prestressed pane is 3 mm or more.

9. The transparent laminate according to claim 1, wherein the thickness of the at least one chemically prestressed pane is 6 mm or more.

10. The transparent laminate according to claim 1, wherein the thickness of the at least one chemically prestressed pane is 9 mm or more.

11. The transparent laminate according to claim 1, wherein the at least one chemically prestressed pane is chemically prestressed on an entire outer surface including a circumferential edge.

12. The transparent laminate according to claim 1, wherein the at least one chemically prestressed pane comprises two chemically prestressed panes.

13. The transparent laminate according to claim 12, wherein the two chemically prestressed panes are joined to one another by a transparent intermediate layer comprising a pourable resin or a polymer film.

14. The transparent laminate according to claim 1, wherein the at least one chemically prestressed pane comprises three or more chemically prestressed panes.

15. The transparent laminate according to claim 14, wherein each of the three or more chemically prestressed panes are joined to one another by a transparent intermediate layer comprising a pourable resin or a polymer film.

16. The transparent laminate according to claim 1, comprising a total laminate thickness of from 30 mm to 200 mm.

17. The transparent laminate according to claim 1, comprising a total laminate thickness of from 50 mm to 150 mm.

18. The transparent laminate according to claim 1, wherein the at least one chemically prestressed pane is an aluminosilicate glass pane or a lithium aluminosilicate glass pane.

19. The transparent laminate according to claim 18, wherein the at least one chemically prestressed pane has, in a region which has not been ion-exchanged, the following components in percent by weight (% by weight):

| | |
|---|---|
| $SiO_2$ | 55 to 72, |
| $Na_2O$ | 8 to 16, |
| $Al_2O_3$ | 11 to 22, |
| $K_2O$ | 0.5 to 7, |
| MgO | 0 to 9, |
| $ZrO_2$ | 0 to 5, |
| ZnO | 0 to 4, |
| CaO | 0 to 4, and |
| $TiO_2$ | 0 to 1. |

20. The transparent laminate according to claim 19, wherein the region which has not been ion-exchanged, of the following components in percent by weight (% by weight):

| | |
|---|---|
| $SiO_2$ | 57 to 63, |
| $Na_2O$ | 11 to 16, |
| $Al_2O_3$ | 15.1 to 18.5, |
| $K_2O$ | 2.8 to 5, |
| MgO | 3 to 9, |
| $ZrO_2$ | 0 to 5, |
| ZnO | 0 to 4, |
| CaO | 0 to 4, |
| $Na_2O + K_2O + MgO + ZnO + CaO$ | 15 to 28, |
| $TiO_2$ | 0 to 1, and |
| $SnO_2 + Cl + F + SO_3 + CeO_2$ | 0 to 1.5. |

21. The transparent laminate according to claim 1, wherein the at least one chemically prestressed pane is a float glass pane having a tin bath side facing an exposed side of the laminate.

22. The transparent laminate according to claim 1, further comprising a transparent polymer layer on a side facing away from an exposed side of the laminate.

23. The transparent laminate according to claim 22, further comprising a glass pane made of a glass having a thickness of from 0.05 to 2 mm arranged on a surface of the polymer layer facing away from the exposed side.

24. The transparent laminate according to claim 23, wherein the glass pane is a chemically prestressed pane.

25. A transparent laminate comprising:

a first glass pane having a surface layer and an interior;

a second glass pane having a surface layer and an interior, the first and second glass panes being composed of aluminosilicate glass or lithium aluminosilicate glass; and a transparent intermediate layer composed of pourable resin or polymer film joining the first and second glass panes to one another, wherein the first and/or second glass panes are chemically prestressed so that the surface layer has a compressive stress (CS) of at least 400 MPa, the interior has a tensile stress (CT) of more than 1 MPa, and the tensile stress (CT) is less than the compressive stress (CS) divided by 50.

* * * * *